June 17, 1924.

E. R. SMITH 1,497,950

MEANS FOR CONTROLLING FLUID PRESSURE PRESSES

Filed Jan. 23, 1922　　4 Sheets-Sheet 1

INVENTOR.
Edward R. Smith
BY
Jones, Addington, Ames & Seibol
ATTORNEYS.

June 17, 1924.
E. R. SMITH
1,497,950
MEANS FOR CONTROLLING FLUID PRESSURE PRESSES
Filed Jan. 23, 1922   4 Sheets-Sheet 4
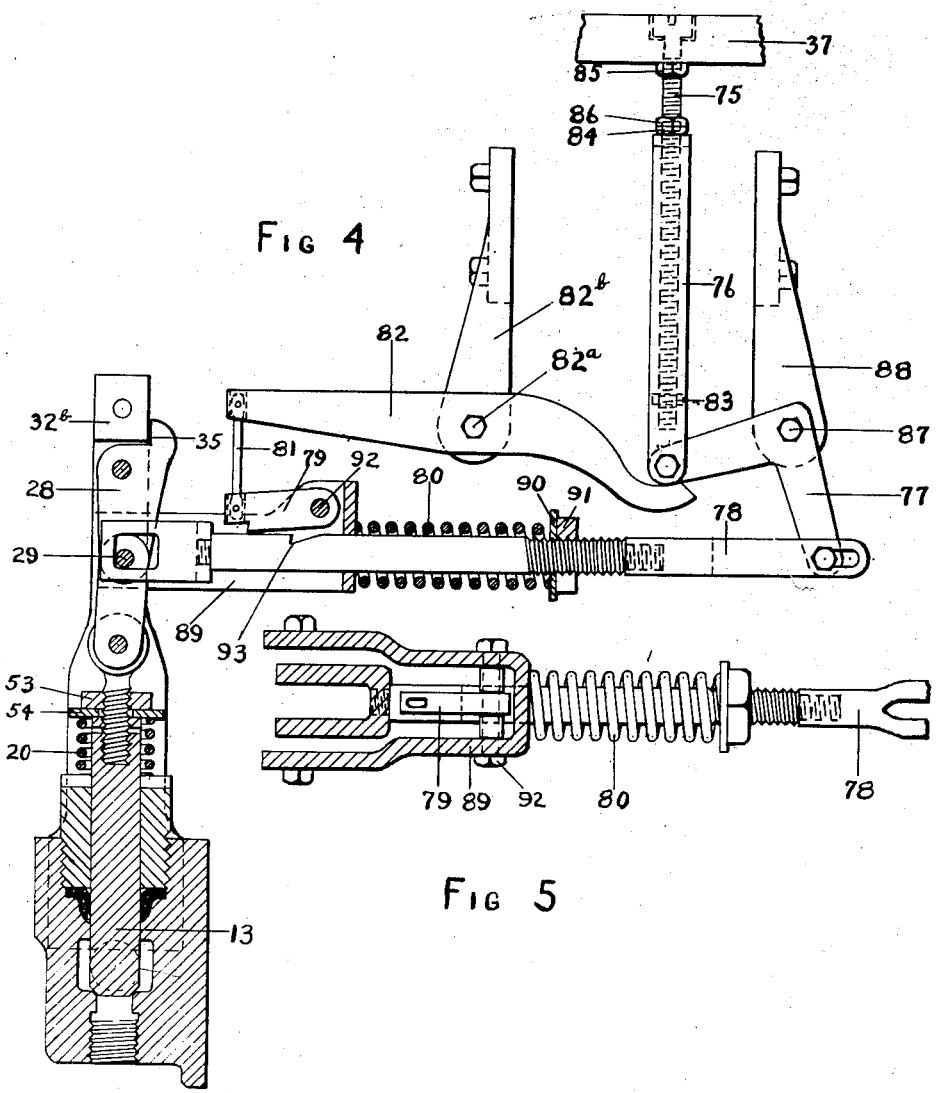

Patented June 17, 1924.

1,497,950

UNITED STATES PATENT OFFICE.

EDWARD R. SMITH, OF SPRINGFIELD, ILLINOIS, ASSIGNOR TO LOURIE MANUFACTURING COMPANY, OF SPRINGFIELD, ILLINOIS, A CORPORATION OF ILLINOIS.

MEANS FOR CONTROLLING FLUID-PRESSURE PRESSES.

Application filed January 23, 1922. Serial No. 531,302.

*To all whom it may concern:*

Be it known that I, EDWARD R. SMITH, a citizen of the United States, residing at Springfield, in the county of Sangamon and State of Illinois, have invented new and useful Improvements in Means for Controlling Fluid-Pressure Presses, of which the following is a full, clear, concise, and exact description, reference being had to the accompanying drawing, forming a part of this specification.

My invention relates to means for controlling fluid pressure presses.

One of the objects of my invention is to provide automatic means for controlling the operating valve of a fluid pressure press.

A further object of my invention is to provide automatic means which will hold the operating valve closed until a predetermined condition is obtained.

A further object of my invention is to provide automatic means which will cause the continuous operation of a fluid pressure press by alternately opening and closing the operating valve.

A further object of my invention is to provide a toggle mechanism which will hold the operating valve closed until a predetermined condition is obtained, which will cause the toggle to be broken and the valve released.

Further objects will appear from the detailed description to follow and from the appended claims.

In the drawings in which several embodiments of my invention are shown—

Figure 2:
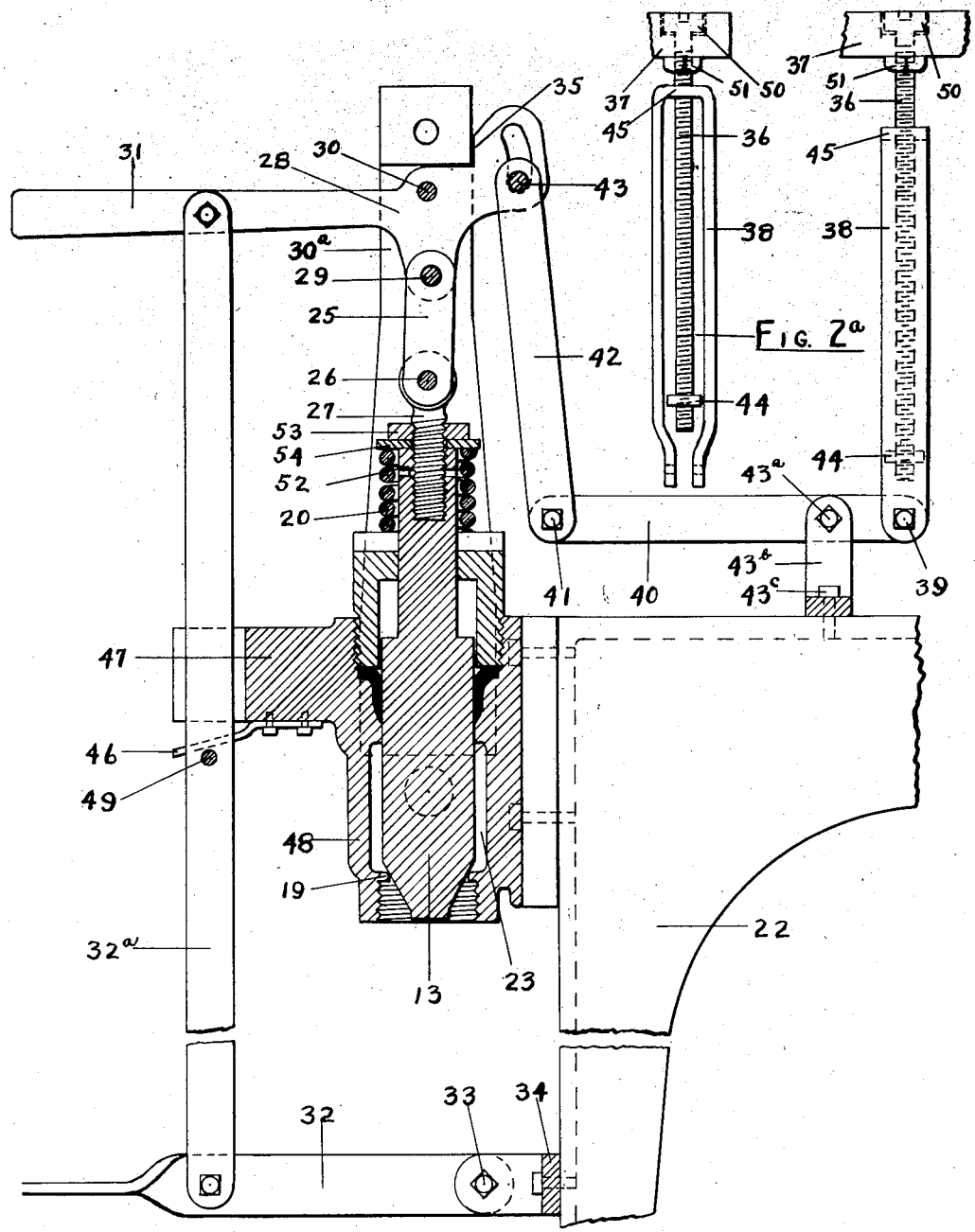
Fig. 2 is a fragmentary side elevational view showing stroke length controlled means for releasing the operating valve.
Figure 3:
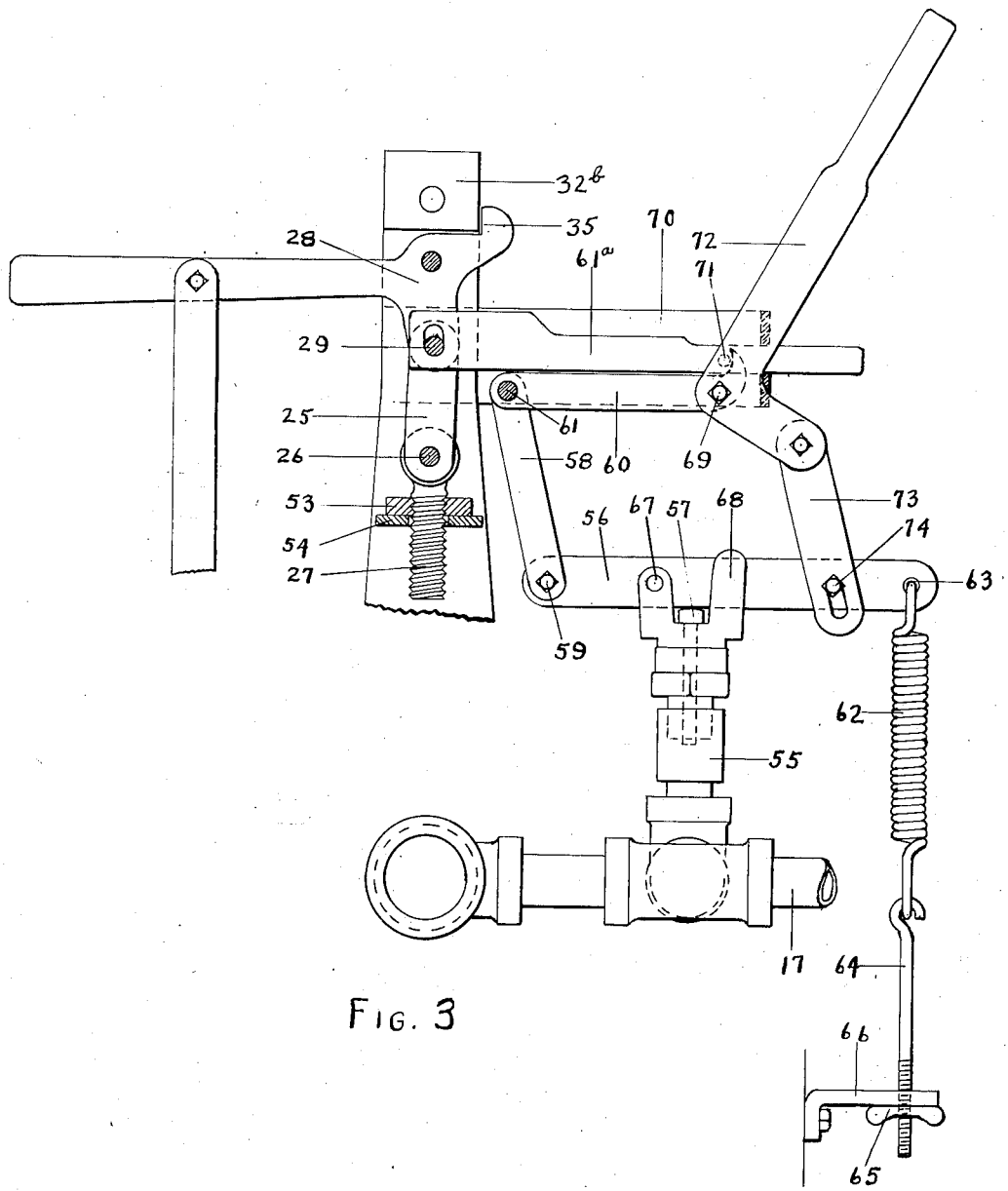

Fig. 2ª is a view showing a yoke and associated parts;

Fig. 3 is a fragmentary side elevational view showing pressure controlled means for releasing the operating valve;

Fig. 4 is a fragmentary side elevational view showing automatic means for repeatedly releasing and closing the operating valve; and Fig. 5 is a detail view of part of Fig. 4.

Figure 1:
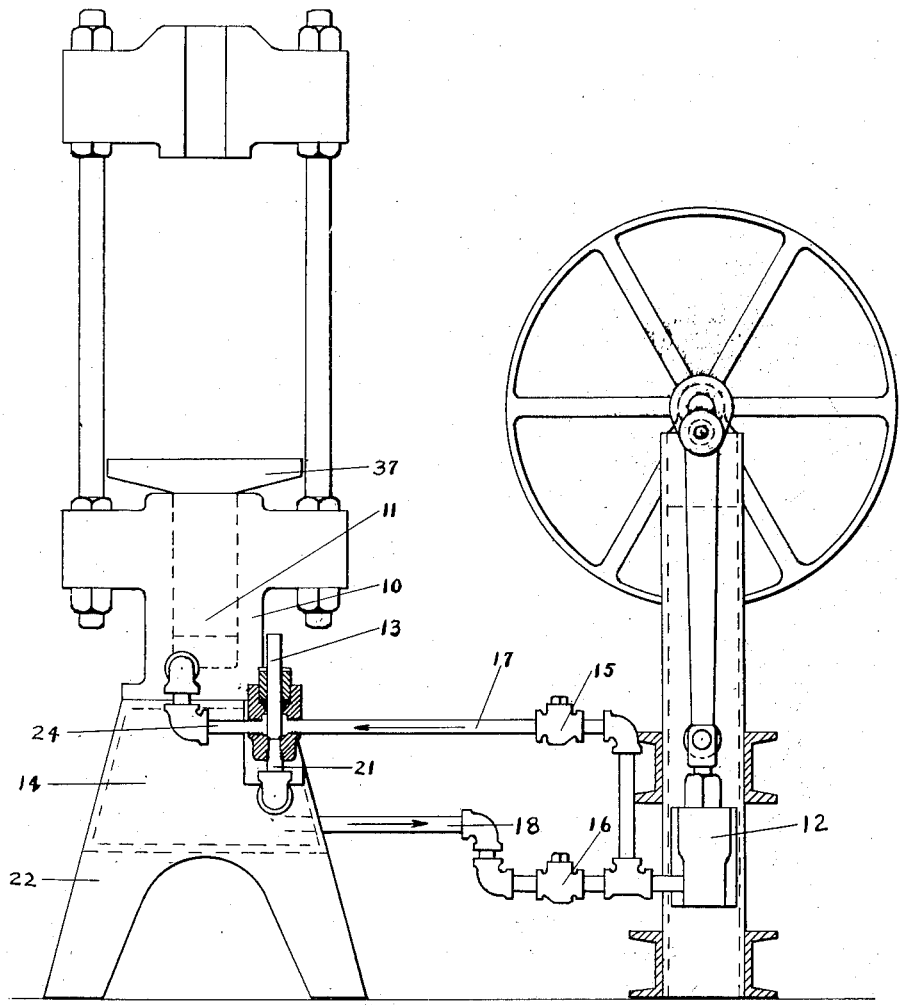
Figure 1 is a somewhat diagrammatic view showing the general arrangement of a hydraulic press, pump and control valve.

Referring now to Figs. 1 and 2, and first to the general arrangement shown in Fig. 1, the construction shown therein comprises a power cylinder 10, a plunger or ram 11 operating in the power cylinder 10, a power pump 12 for forcing liquid into the power cylinder 10, and a system of pipes and control valves between the pump 12 and power cylinder 10 for controlling the flow of liquid and the operation of the power plunger or ram 11.

The system of pipes comprises means affording a passage way from the pump 12 to the operating valve 13, means affording a passage way from the operating valve 13 to the power cylinder 10, means affording a passage way from the operating valve 13 to the tank or reservoir 14, and means affording a passage way from the reservoir 14 back again to the pump 12.

The operating valve 13 may be so operated as to cause the liquid from the pump 12 to be forced into the power cylinder 10, or so as to permit the liquid from the pump to escape into the tank or reservoir 14 without going into the cylinder 10. The operating valve 13 thus controls the operation of the plunger 11 which operates the ram of the press.

As shown in Fig. 1, if the operating valve 13 is down on its seat, the liquid from the pump has to go into the power cylinder 10, and thus acts on the ram 11 to force it upwardly. If, however, the valve 13 is in raised position, the liquid from the pump can escape without resistance into the tank 14 from which it is withdrawn by the pump 12. Thus, when the valve 13 is raised, the liquid is simply pumped without resistance into and out of the tank 14.

Suitable check valves 15 and 16 are provided, the check valve 15 preventing back flow of the liquid on the suction stroke of the pump 12, and the check valve 16 prevents back flow of the liquid on the pressure stroke of the pump 12, the check valve 15 being located in the conduit 17 through which fluid is forced to the operating valve 13, and the check valve 16 being located in the conduit 18 through which the liquid is withdrawn from the tank 14 by the pump 12.

Coming now to the means for automatically controlling the operating valve 13, the construction shown in Fig. 2 comprises means whereby the operating valve 13 will be automatically opened when the ram has moved a predetermined distance. This construction comprises a toggle mechanism which in extended position holds the operating valve 13 against its seat 19, and which, when the toggle is broken, permits the operating valve to be moved under the influence of the coil compression spring 20 to permit the liquid to escape through the discharge pipe 21 into the reservoir 14 in the base 22 of the press. When the valve 13 is on its seat 19, the liquid from the pump 12 is forced to flow through the pipe 17 and around the valve 13 by means of the annular passage 23 to the pipe or conduit 24 which leads from the valve 13 to the power cylinder 10. The toggle mechanism for controlling the operating valve 13 comprises a link 25 (pivoted at 26 to an eye-bolt 27 threaded into the upper end of the valve 13) and a combination lever and link member 28 pivotally connected at 29 to the toggle link 25, and pivotally mounted at 30 on the supporting bracket or yoke 30$^a$. The toggle is moved to extended position to hold the valve 13 against its seat by means of the hand lever portion 31, and if desired, a foot lever 32 may also be provided pivotally connected to the hand lever portion 31 of the member 28 by means of the link 32$^a$, the foot lever 32 being pivotally mounted at 33 on the bracket 34 mounted on the frame 22. The movement of the toggle to locking position is limited by means of a stop shoulder 35 on the member 28, which engages a portion of the supporting bracket 32$^b$ when the toggle is moved to extended position by means of one of the levers 31 or 32.

For automatically breaking the toggle, to permit the spring 20 to open the operating valve 13 when the plunger 11 has moved upward a predetermined distance, a rod 36 is provided, secured to the head of the ram 37, this rod 36 having a lost motion connection with the yoke 38 which is pivotally connected at 39 with the lever 40, which in turn is pivotally connected at 41 with the link 42, which has a lost motion connection at 43 with the member 28, the lever 40 being pivoted at 43$^a$ on the bracket 43$^b$, which is secured to the base 22 by a cap screw or bolt 43$^c$.

In operation, the head of the ram 37 moves upwardly until the nut 44 on the lower end of the rod 36 engages the cross-piece at the upper end of the yoke 38, after which further movement of the ram 37 will cause the yoke 38 also to move upwardly. This will cause the link 42 to move downwardly due to the action of the lever 40, and will break the toggle to permit the spring 20 to raise the valve 13. This releases the liquid in the power cylinder 10, and permits the head of the ram 37 to descend, either by gravity or by the provision of suitable return springs (not shown).

To cause the ram to be again operated, the toggle is moved to extended position by pressing down either on the hand lever 31 or the foot lever 32.

The lost motion connection at 43 between the link 42 and the member 28 is provided in order to permit the spring 20 to quickly throw the operating valve 13 to open position without hindrance from the connection of the link 42 with the member 28. The lost motion connection between the rod 36 and the yoke 38, of course, permits the return movement of the ram head 37, referred to above.

In order to prevent undue jar and shock when the spring 20 throws the operating valve 13 to open position, I provide a leaf-spring 46 mounted on a bracket 47 extending forwardly from the valve casing 48, this leaf-spring being located in position to be engaged by a pin 49 secured to the link 32$^a$. As the coil spring 20 throws the operating valve 13 to open position, the pin 49 is brought against the leaf-spring 46 which absorbs the shock or jar which might otherwise not be escaped.

For adjusting the stroke length of the ram, means are provided whereby the rod 36 may be screwed in or out with respect to the nut 44, and held in adjusted position. For this purpose the upper end of the rod 36 may be provided with a screw head 50 swiveled in the ram head 37, the rod 36 being held in any position to which it may be turned by means of a lock-nut 51 threaded on the rod 36 and engaging the under side of the ram head 37. To screw the rod 36 in or out with respect to the nut 44, the lock-nut 51 is loosened up, and the rod 36 may then be turned in either direction by means of the screw head 50 to screw the rod 36 in or out with respect to the nut 44. The nut 44 is held from turning by the engagement of its edges with the sides of the yoke 38.

In order that the valve 13 may be made to seat properly on the valve seat 19, provision is made for an adjustment between the toggle and valve. This adjustment is effected by providing the valve stem with a series of holes 52 into which a rod may be inserted for turning the valve to thread it in or out with respect to the threaded end of the eye-bolt 27.

In order to lock the valve and eye-bolt in adjusted position, a lock-nut 53 is provided, which can be threaded down to bear on the washer 54 on which the upper end of the spring 20 bears. To adjust the valve stem with respect to the toggle, the lock-nut 53 is loosened up, a bar is inserted through the coils of the spring 20 into engagement with one of the holes 52, and the valve 13 is then turned in one direction or the other to effect the desired adjustment. The lock-nut 53 is then tightened up to hold the valve in the desired adjustment.

It will be seen that a construction is provided which will automatically cause the opening of the operating valve when the ram has moved a predetermined distance, thus limiting the length of stroke of the ram.

In Fig. 3 is shown a construction in which the operating valve is opened when a predetermined pressure in the power cylinder has been reached. In Fig. 3, which is somewhat diagrammatic and in which only the essential parts are shown, a pressure operated knock-out device 55 is provided, which is in communication with and operated by the liquid in the pipe 17 leading from the pump to the operating valve. As the pressure in the pipe 17 increases, (due to the resistance met by the ram, or to whatever cause) and reaches a predetermined pressure, the knock-out valve 55 is operated to break the toggle mechanism and permit the operating valve to be moved from its seat to release the liquid from the power cylinder and to permit the ram to be returned, as described in connection with Fig. 2.

The operating valve may be the same as that shown in Fig. 2, and the toggle mechanism also may be substantially the same, except as to its connection with the controlling means.

In the construction shown in Fig. 3, the transmission from the pressure operated knock-out device 55 to the pivotal connection 29 of the toggle comprises a lever 56, operated by the plunger 57 of the knock-out device, a link 58 pivotally connected at 59 with the lever 56, a lever 60 pivotally connected at 61 with the link 58, and a slide or push-bar 61ª operated by the lever 60, and having a pin and slot connection with the pivotal point 29 of the toggle.

In order to adjust the knock-out device 55 so that it will operate at the desired pressure, a coil tension spring 62 is provided connected at its upper end 63 with the lever 56, and connected at its lower end with the hook bolt 64 on the end of which is threaded a wing nut 65 which bears against the stationary bracket 66.

The lever 56 is pivotally mounted at 67 on a bracket extending upwardly from the knock-out device, the lever 56 being guided in its movement between a pair of standards 68, also extending upwardly from the knock-out device. The lever 60 is pivotally mounted at 69 on a bracket 70 (which extends rearwardly from the bracket 32ᵇ) the point of the lever 60 engaging a pin 71 on the slide 61ª so that a downward movement of the long arm of the lever 60 will move the slide bar in a direction to break the toggle.

The lost motion connection between the slide 61ª and the toggle at 29 permits the spring 20 to throw the operating valve 13 quickly to open position when the toggle is broken, without interference from the connection of the toggle with the slide or push-bar 61ª.

In order that the toggle 25 may be broken by the operator, in case of emergency without waiting for the action of the pressure controlled knock-out, a hand-lever 72 is provided, which is connected by a link 73 with the lever 56. In order that the lever 56 may be operated automatically without causing the hand-lever 72 to oscillate back and forth, a lost motion pin and slot connection is provided at 74 between the link 73 and the lever 56. The hand-lever 72 may be pivotally mounted at 69 on the bracket 70.

In operation, if the operating valve is closed and the pump is operating, when the pressure reaches the predetermined amount it will raise the plunger 57 of the knock-out device against the tension of the spring 62, and will break the toggle, through the intermediary of the transmission referred to, permitting the operating valve to be moved to open position by the action of the spring 20, to release the liquid in the power cylinder of the ram, to permit the return of the ram.

To adjust the knock-out device 55 so that it will operate at the desired predetermined pressure, the wing nut 65 may be threaded in or out with respect to the bolt 64 to increase or lessen the tension of the tension spring 62.

In Figs. 4 and 5 is shown a construction in which the operating valve 13 is automatically and repeatedly opened and closed to cause successive operations of the ram automatically, the release of the valve in this instance being determined by the stroke length. In this construction, the toggle is controlled by means of a rod or bolt 75 secured to the ram head 37, suitable transmission being provided between the rod 75 and the toggle, so that the toggle will be repeatedly straightened out and broken automatically. This transmission comprises a yoke 76, having a lost motion connection with the rod 75, a bell-crank lever 77, pivotally connected with the yoke 76, a spring-pressed slide or push-bar 78 having a lost motion connection at one end with the bellcrank-lever 77 and having a lost motion connection at the other end with the pivotal point 29 of the toggle, a latch or pawl 79 for holding the slide 78 against the action of the spring 80, a link 81 pivotally connected with the latch 79, and a lever 82 pivoted at 82ª on the bracket 82ᵇ pivotally connected with the link 81 and operatively associated with the yoke 76 so as to release the latch 79 when engaged by said yoke.

The yoke 76 is lifted when the nut 83 engages the upper end of the yoke on the upstroke of the ram 37, and is depressed when the nut 84 on the bolt 75 engages the upper side of the cross-bar of the yoke on the downstroke of the ram.

The bolt 75 is swiveled in the head of the ram 37 just as the bolt 36 in the construction of Fig. 2, so that it can be threaded in or out with respect to the nut 83, and the bolt may be held in any position to which it may be turned by means of a lock-nut 85.

The nut 84 which engages the yoke on the downward stroke of the ram may also be threaded up or down on the rod 75, and may be held in any adjusted position by means of the lock-nut 86.

The bell-crank lever 77 may be pivotally mounted at 87 on a fixed bracket 88. The push-rod 78 is slidably mounted in a bracket 89, secured to the bracket 32ᵇ. One end of the spring 80 bears on the bracket 89 and the other on a washer 90 which is held in adjusted position on the slide by means of the nut 91. The latch 79 is pivotally mounted at 92 on the bracket 89. The disposition of the weight of the latch 79 and the lever 82 is such that the latch will normally tend to fall down into latching engagement with the notch 93 in the slide 78.

In operation, if the valve 13 is in closed position, the liquid will enter the power cylinder and cause the ram head 37 to move upwardly until the nut 83 engages the upper end of the yoke 76. Thereupon, further movement of the ram will break the toggle through the intermediary of the yoke 76, the bell-crank-lever 77, and the slide 78. When the toggle is broken, the spring 20 will throw the operating valve to open position, the lost motion connection between the slide 78 and the toggle permitting this quick action of the valve. As the toggle 28 is broken and the valve 13 moved to open position, the slide 78 is pulled to the left far enough to permit the latch 79 to engage the notch 93 to hold the slide 78 to the left against the pressure of the spring 80. When the operating valve 13 is moved to open position, the liquid in the power cylinder can escape into the reservoir, and the ram will be moved downwardly (by its own weight or under the influence of suitable springs) until the nut 84 engages the yoke 76. Further downward movement of the ram will cause the yoke 76 to be moved downward and will cause the latch 79 to be lifted through the intermediary of the lever 82. When the latch 79 releases the slide 78, the slide 78 moves to the right under the influence of the spring 80, and moves the toggle into extended locking position to close the valve 13, the spring 80 being sufficiently strong to overcome any resistance offered by the valve spring 20.

When the valve 13 is closed, the liquid is again caused to enter the power cylinder and starts the ram again on its upward movement. This automatic up and down movement of the ram is repeated continuously as long as the pump is working, the upper and lower limits of the stroke length being definitely determined by the position of the nuts 83 and 84.

It is obvious that my invention may be embodied in other forms covered and defined by the appended claims.

Having thus described my invention what I claim as new and desire to secure by Letters Patent of the United States is:

1. A source of fluid under pressure, a power cylinder connected with said source of fluid under pressure, a plunger operating in said cylinder, an operating valve for releasing the fluid between said source and said cylinder, and automatic means for controlling said operating valve comprising a toggle mechanism, which in extended position holds said operating valve closed, and which when broken permits the valve to open.

2. A source of fluid under pressure, a power cylinder connected with said source of fluid under pressure, a plunger operating in said cylinder, an operating valve for releasing the fluid between said source and said cylinder, and automatic means for controlling said operating valve controlled by said plunger, said automatic means comprising a toggle mechanism, which, in extended position, holds said operating valve closed, and which, when broken, permits the valve to open.

3. A source of fluid under pressure, a power cylinder connected with said source of fluid under pressure, a plunger operating in said cylinder, an operating valve for releasing the fluid between said source and said cylinder, and automatic means for controlling said operating valve operated when the plunger has been moved a predetermined distance, said automatic means comprising a toggle mechanism, which, in extended position, holds said operating valve closed, and which, when broken, permits the valve to open.

4. A source of fluid under pressure, a power cylinder connected with said source of fluid under pressure, a plunger operating in said cylinder, an operating valve for releasing the fluid between said source and said cylinder, and automatic means for repeatedly releasing and closing said operating valve, said automatic means comprising a toggle mechanism, which, in extended position, holds said operating valve closed, and which, when broken, permits the valve to open.

In witness whereof, I have hereunto subscribed my name.

EDW. R. SMITH.